United States Patent [19]

Krennbauer

[11] 4,405,374
[45] Sep. 20, 1983

[54] PROCESS OF PRODUCING CEMENT AND PLANT FOR CARRYING OUT THE PROCESS

[75] Inventor: Franz Krennbauer, Linz, Austria

[73] Assignee: Voest-Alpine Aktiengesellschaft, Linz, Austria

[21] Appl. No.: 362,499

[22] Filed: Mar. 26, 1982

[30] Foreign Application Priority Data

Apr. 15, 1981 [AT] Austria .................................. 1707/81

[51] Int. Cl.³ .............................................. C04B 7/44
[52] U.S. Cl. ...................................... 106/100; 432/14; 432/58; 432/106
[58] Field of Search ..................... 106/100; 432/14, 58, 432/106

[56] References Cited

U.S. PATENT DOCUMENTS 4,276,020 6/1981 Shibuya et al. ...................... 106/100

FOREIGN PATENT DOCUMENTS 2931590 2/1980 Fed. Rep. of Germany ...... 106/100

Primary Examiner—James Poer
Attorney, Agent, or Firm—Kurt Kelman

[57] ABSTRACT

In a process of producing cement, a powdered mixture of raw materials is de-acidified in a calcinator and subsequently burned in a kiln. Before de-acidification, the mixture is preheated in a plurality of heat exchange stages by the exhaust gases from the kiln and from the calcinator, which are passed through respective parallel series of the heat exchange stages, the powdered mixture being passed from heat exchange units of each series to associated heat exchange units of the other series. The heat efficiency of this process is improved by combining the exhaust gas streams from the kiln and from the calcinator coming from the parallel series of heat exchange stages, and then feeding the combined stream of exhaust gases to another heat exchange stage, which is the last stage in the flow path of the exhaust gases and to which the cold powdered mixture of raw materials is fed.

4 Claims, 1 Drawing Figure

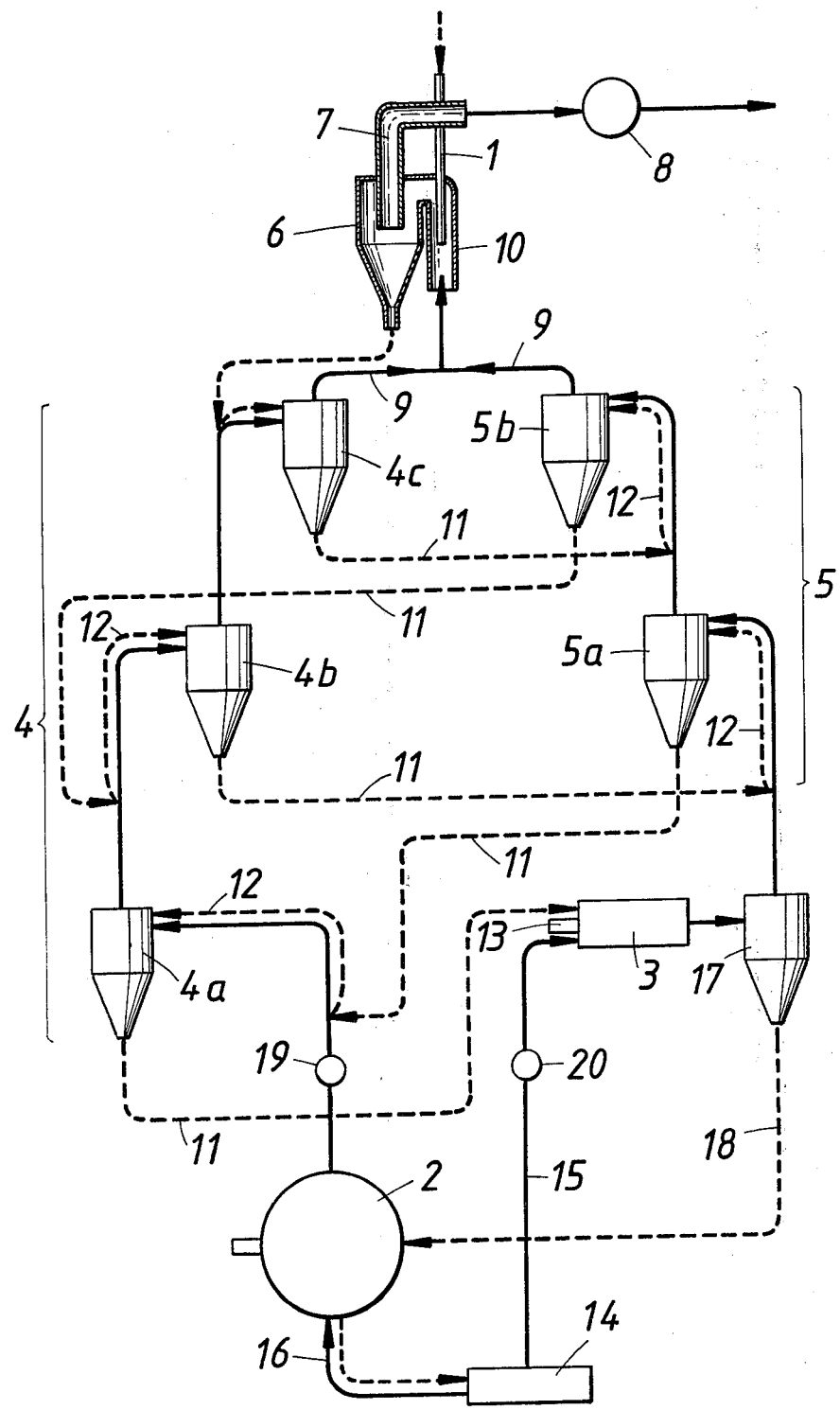

PROCESS OF PRODUCING CEMENT AND PLANT FOR CARRYING OUT THE PROCESS

BACKGROUND OF THE INVENTION

(1) Field of the Invention

The invention relates to a process of producing cement, in which a powdered raw materials mixture is de-acidified in a calcinator and subsequently burned in a kiln and before being de-acidified is preheated by a heat exchange with exhaust gas streams from the kiln and from the calcinator, wherein the exhaust gas streams from the kiln and from the calcinator are conducted in respective parallel series of heat exchange stages and the powdered raw materials mixture is transferred in alternation from a heat exchange stage of one of said series to a heat exhange of the other of said series, and to a plant for carrying out that process.

(2) Description of the Prior Art

In order to improve the de-acidification in the calcinator by a reduction of the carbon dioxide partial pressure and to improve the preheating of the powdered raw materials mixture before it enters the calcinator, it is known from Opened German Application No. 29 31 590 to supply the calcinator, e.g., with the heated air which has been used to cool the cement clinker formed by the burning of the powdered raw materials mixture and to supply the exhaust gas from the kiln to the heat exchanger used to preheat the powdered raw materials mixture. The exhaust gas streams from the kiln and from the calcinator are conducted in respective parallel series of heat exchange stages and the stream of the powdered raw materials mixture is passed in alternation from a heat exchange stage of one to said series to a heat exchange stage of the other of said series before the mixture is supplied to the calcinator. These measures have the result that the exhaust gas from the kiln does not enter the calcinator so that a relatively low carbon dioxide content can be maintained during the calcinating step. Besides, owing to the flow of the exhaust gases in two streams fed from different sources, a very desirable utilization of the sensible waste heat of the exhaust gases is permitted and the powdered raw material mixture can be preheated to a higher temperature than in a process using only a single exhaust gas stream because the hot exhaust gas from the kiln enters the heat exchanger at a temperature which exceeds the inlet temperature of the exhaust gas from the calcinator. A disadvantage inherent in said known plants resides in that approximately equal temperatures of the two exhaust gas streams from the heat exchanger cannot be ensured unless the weight ratio of the two streams of the powdered raw materials mixture is carefully controlled. This requirement involves a higher structural expenditure and a poorer utilization of heat because under conditions equal in other respects the exit temperatures of the exhaust gas streams depend on the weight ratio of powdered raw materials mixture and exhaust gas. Besides, a separate blower is required for handling each exhaust gas streams or an oversize single blower must be provided because the exhaust gas streams must be expected to differ in temperature and pressure.

SUMMARY OF THE INVENTION

It is an object of the invention to avoid these disadvantages and so to improve a process of producing cement of the kind described first hereinbefore that the required equipment expenditure is much reduced and the heat efficiency is increased.

This object is accomplished according to the invention in that the parallel exhaust gas streams from the kiln and from the calcinator, respectively, are combined, the combined streams are supplied to an additional heat exchange stage, which is the last heat exchange stage in the flow path of the exhaust gases, and the cold powdered raw materials mixture is fed to said additional heat exchange stage and is heated therein before it is delivered to the heat exchange stages of said two series in alternation.

The combination of the two exhaust gas streams before the last heat exchange stage in the flow path of the exhaust gases ensures that the exhaust gases leaving the last heat exchange stage will have the same temperature and the same pressure so that the exhaust gases can be handled by a single blower, which need not be oversize. Besides, there is no need for means for proportioning the powdered raw materials mixture before it is charged because said mixture can be fed to the heat exchanger in a single stream. This will result in a desirable utilization of the sensible waste heat of the combined exhaust gas streams in the last heat exchange stage in the flow path of the exhaust gases.

In order to ensure optimum conditions in said last heat exchange stage which is flown through by the combined exhaust gas streams, the exhaust gas streams should be combined when they are under gas pressures which are at least approximately alike. This can usually be ensured in that the several heat exchange units flow through by the exhaust gas from the kiln are so designed that the resistance to the flow of the exhaust gas from the kiln in said units is properly increased so that the separation of the powdered raw materials mixture will be removed if the heat exchange units consist of cyclones, as is generally usual.

A plant for carrying out the process may desirably comprise a kiln for burning the powdered raw materials mixture which has been de-acidified and a calcinator which precedes the kiln and is connected to a multistage heat exchanger having heat exchange units arranged in two parallel series, which are respectively connected to an exhaust gas outlet of the kiln and an exhaust gas outlet of the calcinator, and ducts connecting outlets for discharging raw materials mixture from heat exchange units of each of said series to inlets for supplying powdered raw materials mixture to associated heat exchange units to the other of said series. In such plant, the exhaust gas outlets of the last heat exchange units in the exhaust gas flow paths through said series are connected to a gas inlet of an additional heat exchange unit, which is associated with both said series and is fed with the cold powdered raw materials mixture. Said mixture will be heated in said additional heat exchange unit by the combined exhaust gas streams from both said series so that it is no longer necessary to conduct the powdered raw materials mixture in separate partial streams and the equipment expenditure involved in the handling of separate streams can be eliminated. Besides, any differences regarding the temperatures and pressures of the two exhaust gas streams will be eliminated so that the blower which receives the exhaust gases from said last heat exchange unit will operate under uniform temperature and pressure conditions.

BRIEF DESCRIPTION OF THE DRAWING

A plant for carrying out a process for producing cement in accordance with the invention is shown by way of example in a block diagram in the accompanying drawing.

DESCRIPTION OF THE PREFERRED EMBODIMENT

In the drawing, the flow path of the powdered raw materials mixture is indicated by dotted lines. Said mixture is supplied in a supply duct 1 to a multi-stage heat exchanger, which is fed with exhaust gas from a rotary kiln 2 used to burn the powdered raw materials mixture when it has been preheated and calcined, and with exhaust gas from a calcinator 3, which precedes the rotary kiln 2 in the flow path of the powdered mixture. In the exhaust gases from the rotary kiln 2 and from the calcinator 3 flow through the heat exchanger in respective parallel series 4 and 5 of heat exchange units consisting of cyclones. The series 4 consists of the heat exchange units 4a, 4b, 4c and the series 5 consists of the heat exchange units 5a, 5b. The flow paths of the exhaust gases are indicated by solid lines. From the two parallel series 4 and 5, the exhaust gases flow through a common heat exchange unit 6, which is connected by a gas discharge duct 7 to a blower 8 for blowing off the cooled exhaust gases. The heat exchange units 4c and 5b of the heat exchanger which are the last units in their respective series have gas outlets 9, which communicate with the gas inlet 10 of the succeeding heat exchange unit 6. The stream of powdered raw materials mixture is supplied through the supply duct 1 to the heat exchange unit 6 and is heated therein by the combined exhaust gas streams and is subsequently conducted from heat exchange units of each of the series 4 and 5 to associated heat exchange units of the respective other series because the outlets 11 for discharging powdered raw material mixture from heat exchange units of each of the series 4 and 5 communicate with the inlets 12 for supplying raw materials mixture to associated heat exchange units of the respective other series. As a result, the stream of the powdered raw materials mixture is heated by exhaust gases from the rotary kiln 2 and from the calcinator 3 in alternation. That heat exchange unit 4a of the heat exchanger which is the last heat exchange unit flown through the by powdered raw materials mixture is heated by the hot exhaust gas from the kiln so that the powdered raw materials mixture which has thus been preheated has a relatively high temperature as it enters the calcinator 3. In the latter, additional heat from a burner 13 is supplied to the powdered raw materials mixture in order to de-acidify the mixture. The combustion air supplied to said burner may consist of part of the heated air which has been used in a cooler 14 to cool the cement clinker formed by the burning of the powdered raw materials mixture in the rotary kiln 2. The duct 15 is used to supply the heated cooling air to the calcinator 3. Another portion of the heated cooling air from the cooler 14 may be supplied in duct 16 to the rotary kiln 2 as combustion air.

The powdered raw materials mixture which has been de-acidified in the calcinator 3 is fed with the exhaust gases from the calcinator to a cyclone separator 17, from which a discharge duct 18 for the powdered raw materials mixture leads to the rotary kiln 2. The hot exhaust gas from the calcinator is supplied to the heat exchange unit 5a for preheating the powdered raw materials mixture.

To ensure that the pressures in the gas outlets 9 of the heat exchange unis 4c and 5b will be as nearly equal as possible, the heat exchange units of the two series 4 and 5 may be designed for different resistances to the flow of the exhaust gases so that different pressure losses in the two series 4 and 5 will be compensated. An exact matching can be effected by a throttle valve 19 in the exhaust gas duct from the rotary kiln 2. The rate at which combustion air is supplied to the calcinator 3 can be controlled by a hinged valve 20 in the supply duct 15 in dependence on the rate at which fuel is fed to the burner 13.

What is claimed is:

1. In a process of producing cement, wherein
a powdered raw materials mixture is de-acidified in a calcinator and is subsequently burned in a kiln and before being fed to said calcinator is preheated in a plurality of stages by a heat exchange with exhaust gases from said calcinator and from said kiln in a heat exchanger in which said heat exhaust gases from said calcinator and from said kiln flow through respective parallel series of heat exchange stages and said powdered raw materials mixture is passed from heat exchange stages of each of said series to associated heat exchange stages of the other of said series,
the improvement residing in that
said exhaust gases from said calcinator and from said kiln which have flown through said respective series are combined and then passed through an additional heat exchange stage, which the last heat exchange stage in the flow path of the exhaust gases and is fed with said powdered raw materials mixture before said mixture is fed to the heat exchange stages of said two series in alternation.

2. The improvement set forth in claim 1, wherein said exhaust gases from said calcinator and from said kiln are under at least approximately the same gas pressures as they are combined.

3. In a plant for producing cement, comprising
a calcinator for de-acidifying a powdered raw materials mixture,
a kiln for firing the powdered raw materials mixture which has been de-acidified in said calcinator, and
a heat exchanger for preheating said powdered raw materials mixture before it is fed to said calcinator, said heat exchanger comprising first and second parallel series of heat exchange units connected to receive exhaust gases from said calcinator and from said kiln, respectively, and means for conducting said raw materials mixture from heat exchange units of each of said series to associated heat exchange units of the other of said series,
the improvement residing in that said heat exchanger comprises
means for combining the exhaust gases from said calcinator which have flown through said first series and the exhaust gases from said kiln which have flown through said second series and
an additional heat exchange unit which is the last heat exchange unit flown through by the exhaust gases and arranged to receive the thus combined exhaust gases from said calcinator and from said kiln and to receive said powdered raw materials mixture and to deliver it to said heat exchange units of said first and second series.

4. The improvement set forth in claim 3, wherein each of said series comprises a heat exchange unit which is the last of said units flown through by exhaust gases in said series, said combining means are arranged to receive the exhaust gases from the last of said units of both said series, and said additional heat exchanger is arranged to deliver said powdered raw materials mixture to said last heat exchange unit of one of said series.

* * * * *